US009552655B2

(12) United States Patent
Freeman

(10) Patent No.: US 9,552,655 B2
(45) Date of Patent: Jan. 24, 2017

(54) IMAGE PROCESSING VIA COLOR REPLACEMENT

(71) Applicant: Holition Limited, London (GB)

(72) Inventor: Russell Freeman, London (GB)

(73) Assignee: HOLITION LIMITED, London (GB)

( * ) Notice: Subject to any disclaimer, the term of this patent is extended or adjusted under 35 U.S.C. 154(b) by 0 days.

(21) Appl. No.: 14/433,367

(22) PCT Filed: Oct. 2, 2013

(86) PCT No.: PCT/GB2013/052573
§ 371 (c)(1),
(2) Date: Apr. 2, 2015

(87) PCT Pub. No.: WO2014/053837
PCT Pub. Date: Apr. 10, 2014

(65) Prior Publication Data
US 2015/0248775 A1    Sep. 3, 2015

(30) Foreign Application Priority Data

Oct. 3, 2012 (GB) .................................. 1217721.8
Apr. 24, 2013 (GB) .................................. 1307372.1

(51) Int. Cl.
*H04N 1/60* (2006.01)
*H04N 1/64* (2006.01)
(Continued)

(52) U.S. Cl.
CPC .......... *G06T 11/001* (2013.01); *G06T 7/0081* (2013.01); *G06T 7/0097* (2013.01);
(Continued)

(58) Field of Classification Search
CPC combination set(s) only.
See application file for complete search history.

(56) References Cited

U.S. PATENT DOCUMENTS 6,556,704 B1 * 4/2003 Chen .................. G06K 9/20
382/154
2006/0239548 A1 10/2006 Gallafent et al.
(Continued)

OTHER PUBLICATIONS

Invitation to Pay Additional Fees and Partial International Search Report issued in Application No. PCT/GB2013/052573 on Feb. 13, 2014.
(Continued)

*Primary Examiner* — Wesner Sajous
(74) *Attorney, Agent, or Firm* — Morris & Kamlay LLP

(57) ABSTRACT

There is described an image processing method in which a scene is repeatedly imaged to form a series of input images. For at least a subset of the input images, a color calibration procedure is conducted which populates a foreground color histogram with the frequency of occurrence of color values in a stencil area of the input image, and populates a background color histogram with the frequency of occurrence of color values outside of the stencil portion of the input image. For at least a subset of the input images, a color replacement procedure is conducted which updates the stencil area based on a determination, from the color values of pixels within the input image, of likelihood values representing the likelihood of pixels belonging to an image area of interest, the likelihood value for each color value being determined from a combination of the foreground and background color histograms, replaces the original color values of pixels within the updated stencil area of the input image with replacement color values, and displays the image on which color replacement processing has been conducted. In this way, a stencil area is determined based on foreground/background histogramming, and used both to define an area to which color replacement processing is to be conducted, and also an area for use in further populating the (Continued)

color histograms to calibrate the color replacement processing.

10 Claims, 14 Drawing Sheets

(51) Int. Cl.
| | | |
|---|---|---|
| *G06F 3/0484* | (2013.01) | |
| *G06K 9/46* | (2006.01) | |
| *G06K 15/00* | (2006.01) | |
| *G06T 11/00* | (2006.01) | |
| *G06T 7/00* | (2006.01) | |
| *G06T 5/40* | (2006.01) | |

(52) U.S. Cl.
CPC ............ *G06T 2207/10016* (2013.01); *G06T 2207/10024* (2013.01); *G06T 2207/10028* (2013.01); *G06T 2207/20144* (2013.01); *G06T 2207/20148* (2013.01); *G06T 2210/16* (2013.01)

(56) References Cited

U.S. PATENT DOCUMENTS

| | | | |
|---|---|---|---|
| 2010/0027876 A1* | 2/2010 | Avidan | G06T 3/0012 382/162 |
| 2011/0211749 A1 | 9/2011 | Tan et al. | |
| 2012/0294521 A1* | 11/2012 | Lee | G06T 7/0071 382/164 |
| 2013/0136307 A1* | 5/2013 | Yu | H04N 7/181 382/103 |
| 2013/0162629 A1* | 6/2013 | Huang | G06T 7/0071 345/419 |
| 2016/0006914 A1* | 1/2016 | Neumann | G06F 3/0325 348/78 |

OTHER PUBLICATIONS

Gordon, et al., "Background estimation and removal based on range and color", Proceedings of the 1999 IEEE Computer Society Conference on Computer Vision and Pattern Recognition, Jun. 23-25, 1999; Fort Collins, Colorado, IEEE, The Institute of Electrical and Electronics Engineers, Inc, US, vol. 2, Jun. 23, 1999 (Jun. 23, 1999), pp. 459-464, XP010347568.

Gvili, et al., "Depth Keying", Proceedings of SPIE, SPIE, US, vol. 5006, Jan. 2003 (Jan. 2003), pp. 564-574, XP003006231.

Iwabuchi, et al., "Smart Makeup Mirror: Computer-Augmented Mirror to Aid Makeup Application", Jul. 19, 2009 (Jul. 19, 2009), Human-Computer Interaction. Interacting in Various Application Domains, Springer Berlin Heidelberg, Berlin, Heidelberg, pp. 495-503, XP019122334.

Kulkarni, "Histogram-based foreground object extraction for indoor and outdoor scenes", Proceedings of the Seventh Indian Conference on Computer Vision, Graphics and Image Processing, ICVGIP '10, Jan. 2010 (Jan. 2010), pp. 148-154, XP055099777, New York, New York, USA.

* cited by examiner

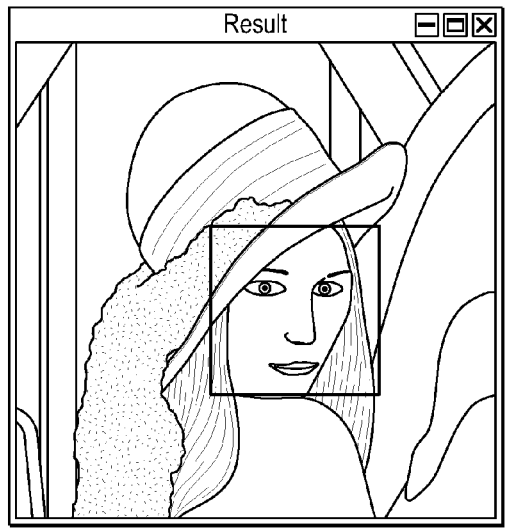
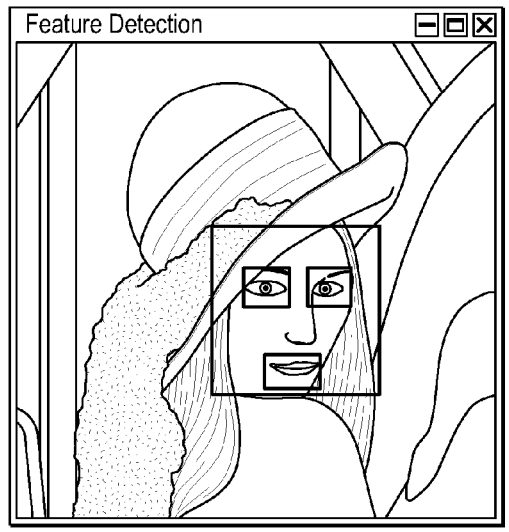
FIG. 11A           FIG. 11B
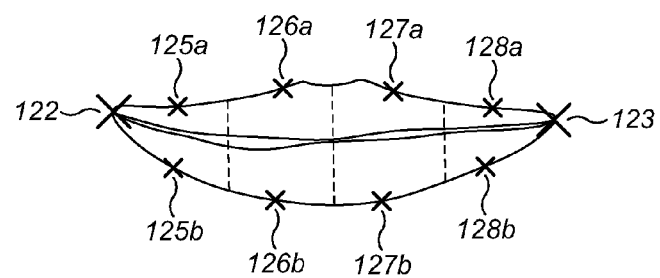
FIG. 12

IMAGE PROCESSING VIA COLOR REPLACEMENT

FIELD OF THE INVENTION

The present invention relates to image processing. Embodiments of the invention relate to an image processing method and image processing apparatus in which colour changes are made to an input image signal. Embodiments of the invention also relate to a method an apparatus for calibrating a video camera and a depth sensor together.

BACKGROUND OF THE INVENTION

Clothes are frequently available in a variety of different colours. It is inconvenient for a prospective purchaser to need to try on a particular item of clothing multiple times in different colours. Similarly, trying on different shades of lipstick is difficult, because the wearer needs to remove the previous shade of lipstick before the new shade of lipstick can be applied. It would be desirable to provide a method and apparatus which alleviates the above problems.

SUMMARY OF THE INVENTION

According to an aspect of the invention, there is provided an image processing method, comprising:

repeatedly imaging a scene to form a series of input images;

for at least a subset of the input images, conducting a colour calibration procedure of:

populating a foreground colour histogram with the frequency of occurrence of colour values in a stencil area of the input image;

populating a background colour histogram with the frequency of occurrence of colour values outside of the stencil portion of the input image; and for at least a subset of the input images, conducting a colour replacement procedure of:

updating the stencil area based on a determination, from the colour values of pixels within the input image, of likelihood values representing the likelihood of pixels belonging to an image area of interest, the likelihood value for each colour value being determined from a combination of the foreground and background colour histograms;

replacing the original colour values of pixels within the updated stencil area of the input image with replacement colour values; and displaying the image on which colour replacement processing has been conducted.

In this way, a user is able to view an image of themself wearing a particular garment in any desired colour. A stencil area is determined based on foreground/background histogramming, and used both to define an area to which colour replacement processing is to be conducted, and also an area for use in further populating the colour histograms to calibrate the colour replacement processing. It will be appreciated that the terms "foreground" and "background" in the context of the colour histograms do not necessarily refer to elements of an image which are relatively closer to and further from the imaging apparatus. In some cases this may be correct, but more accurately the foreground histogram is intended to store the frequency of colour values in an area of interest, while the background histogram is intended to store the frequency of colour values outside of an area of interest. It will be appreciated that the foreground and background histograms are only an approximation of the area of the interest, and so may not definitely represent these areas. In contrast, the foreground and background regions of a depth map generated by a depth camera do represent foreground and background in the sense elements which are relatively closer to and further from the depth camera, although the foreground regions in this case are also the areas of interest.

There are many ways in which the foreground and background histogram can be combined in order to generate likelihood values representing the likelihood of a given colour value corresponding to an area of interest within an input image/scene. One technique is to use a Bayesian combination of the foreground and background colour histograms. Such a technique is described in detail below. Other probabilistic methods, or deterministic methods of combining the foreground and background histograms to arrive at a likelihood value for each colour value may also be used.

In some embodiments only colour values corresponding to the stencil area are modified or replaced. In some cases this may be by assigning a predetermined target colour (optionally modified by the colour and/or intensity of the original colour) to pixels within the stencil. A different target colour may be applied to different regions of the stencil—for example to provide a smoothing effect at the edges. In some cases the stencil may specify an area in which a static or moving overlay may be superimposed over the existing image. This could be used to overlay a motif, logo or video sequence onto a garment worn by a user for example. In other embodiments colour values of pixels outside of the stencil area are also modified or replaced, but on a different basis to colour values of pixels within the stencil area. For example, the area outside of the stencil area could be completely removed (replaced with pixels of a homogeneous fixed colour), or replaced with a background scene image. In some cases the colour values of pixels inside of the stencil might be unaltered, with only the pixels outside of the stencil area being modified or replaced.

It is also possible to use this technique to track and calibrate two different areas of interest within an image. This can be achieved by using two foreground colour histograms, each being initialised with a separate stencil area corresponding to a respective different area of interest. This initialisation could be achieved by permitting an operator to select those areas of interest from an input image, or by using different predetermined areas corresponding to where a target object or person in the scene could be expected to start. This could be useful for example where two customers, each wearing a garment of a different original colour, would like to be independently tracked and displayed wearing differently coloured colour-replaced garments. Either one background histogram could be used for tracking both areas of interest—being populated with the frequency of colour values of pixels outside both stencil areas, or alternatively two background histograms could be used, the background histogram for tracking the first area of interest being populated with the frequency of colour values of all pixels outside the first area of interest, and the background histogram for tracking the second area of interest being populated with the frequency of colour values of all pixels outside the second area of interest.

The colour calibration procedure may comprise generating a lookup table providing a likelihood of each colour value occurring in an area of interest within the scene, the likelihoods being determined from a combination of the foreground and background histograms. In this case, the stencil area is updated in the colour replacement procedure by obtaining the likelihood values for each pixel colour value from the lookup table. As a result, the stencil area can be updated much more quickly, since the colour values need only be compared with pre-calculated values in a lookup table rather than being used to trigger a computation based on the foreground and background colour histograms. This is particularly significant for the colour replacement processing stage, where the foreground and background colour histograms do not change every frame, and thus the use of a lookup table avoids the need for the same computation to be repeated multiple times.

A step of generating a Gaussian model representing the frequency distribution of colours in the foreground colour histogram may also be provided. In this case, the likelihood of each colour value occurring in an area of interest within the scene is determined based in part on the distance in colour space between the colour value and the Gaussian model. This serves to focus the area of interest on a particular dominant colour space.

The colour calibration procedure may comprise a step of updating the stencil area based on a determination, from the colour values of pixels within the input image, of likelihood values representing the likelihood of pixels belonging to an image area of interest. The likelihood value for each colour value may be determined from a combination of the foreground and background colour histograms comparison of colour values of pixels of an input image with the most recently generated lookup table. The step of updating the stencil area may be conducted by obtaining the likelihood values for each pixel colour value from the lookup table. The input image to which the step of generating the lookup table is applied may be an input image captured subsequently to the input image used to generate the updated stencil area. Alternatively, the same input image may be used for both steps—permitting the same image to be used for multiple iterations of the colour calibration procedure.

The step of populating the foreground histogram may be repeated by accumulating the number of times a particular colour value occurs in the stencil area of the input image with the number of times that colour occurs in the previously populated foreground histogram. Similarly, the step of generating the background histogram may be repeated by accumulating the number of times a particular colour value occurs outside of the stencil area of the input image with the number of times that colour occurs in the previously populated background histogram. In this way, the content of the histograms is averaged over a plurality of frames. Additionally, the step of populating the background histogram may involve reducing the number of times a particular colour value occurs in the previously populated background histogram when that colour occurs in the stencil area of the input image. This may serve to accelerate the rate at which the stencil expands to correspond to a garment or target area of interest.

The input image to which the step of replacing the original colour values is applied may be an input image captured subsequently to the input image used to generate the lookup table. Alternatively, the input image may be the same for both steps—permitting the same image to be used for both training the colour calibration procedure and to be the subject of colour replacement processing.

The stencil area may be initialised as a predetermined area within an image. This may for example be a small square or other shape at the centre of the image where a person would be expected to stand. Alternatively, the stencil area may be initialised by receiving a user selection of an area of interest in the input image. This provide a starting point for an area of interest which is much closer to the desired area, resulting in much faster calibration. This may be achieved by having the operator draw around the garment or other object in a captured input image.

The stencil area may be arrived at via a number of image processing steps. For example, the step of updating the stencil area may comprise executing a blur operation on the input image. The step of updating the stencil area may also comprise determining, for each pixel of the input image, a likelihood value representing the likelihood of that pixel belonging to an area of interest within the scene. The step of updating the stencil area may comprise generating a binary map by comparing the likelihood value for each pixel with a predetermined threshold value, and setting a value for each pixel to a logical zero or one in dependence on the result of the comparison. The step of updating the stencil area may comprise conducting one or more morphological operations on the binary map. The one or more morphological operations may comprise one or more of an erode operation (for removing noise and other small areas of the binary map, and a dilate operation, for recovering or expanding beyond the original boundaries of an area of interest in the binary map. The one or more morphological operations may comprise, in sequence a first erode operation, a series of dilate operations, and a second erode operation.

The step of updating the stencil area may comprise excluding areas of interest in the binary map which are smaller than a predetermined size. The identification of whether an object in a binary map is larger or smaller than a predetermined size could be achieved using a flood fill operation, The step of updating the stencil area comprises excluding areas of interest in the binary map which are not at, nor within a predetermined distance left or right of, the centroid of the areas of interest in the binary map.

A depth map can also be used to ensure that all parts of the area of interest are part of a foreground area within a scene. In this case, the following steps may be provided:
   generating a depth map of the scene; and
   determining from the depth map a foreground area of the input image;

The step of updating the stencil area in this case may comprise excluding from the stencil area areas of the input image determined from the depth map not to relate to a foreground area.

Alternatively, the following steps may be provided:
   generating a depth map of the scene;
   generating from the depth map a foreground map indicating areas of the input image which are considered to relate to a foreground area of the scene; and
   excluding areas of interest in the binary map which do not occur as foreground areas in the foreground map.

While the invention may be used to perform colour replacement of worn garments, it can also be used to perform colour replacement of other solid-colour areas within a captured image, such as skin tone or fingernails. Worn makeup may also be detected and colour-replaced, permitting augmented reality foundation, eye shadow, lipstick or blusher to be provided. In the case of lipstick, the stencil area may be initialised as a mouth area of the face of a person within the scene being imaged, and the background colour histogram may be populated with the frequency of occurrence of colour values outside of the stencil portion of the input image but within a bounded area surrounding the stencil portion, the bounded area being initialised as a face area of the person within the scene being imaged. Haar processing may be used to isolate these areas from the image to initialise the process. The stencil area in this case may be updated by determining, for pixels in at least a portion of the input image, a likelihood value representing the likelihood of that pixel belonging to an area of interest within the scene, generating a binary map by comparing the likelihood value for each pixel with a predetermined threshold value, and setting a value for each pixel to a logical zero or one in dependence on the result of the comparison, and updating the stencil area based on one or more areas of interest within the binary map.

This technique results in the lips of a person's face being isolated as an area of interest. In one embodiment, the lip area of interest may be cleaned up when formulating a stencil area by detecting left and right extreme points of an area of interest within the binary map;

dividing the area of interest into a plurality of sections between the detected left and right extreme points;

determining an average upper bound and an average lower bound within each section; and updating the stencil area based on the edge contour defined by the extreme left and right points and average upper and lower bounds.

The boundary area may be updated to correspond to a smaller area surrounding the stencil area after the stencil area has been updated for the first time. This results in the background area comprising mainly colours corresponding to skin tone. The boundary area may be moved from frame to frame to track the position of the stencil area (lips).

Viewed from another aspect, there is provided an image processing apparatus, comprising:

a camera for repeatedly imaging a scene to form a series of input images;

a processor, operable in relation to at least a subset of the input images, to conduct a colour calibration procedure of:

populating a foreground colour histogram with the frequency of occurrence of colour values in a stencil area of the input image;

populating a background colour histogram with the frequency of occurrence of colour values outside of the stencil portion of the input image; and the processor being operable, for at least a subset of the input images, to conduct a colour replacement procedure of:

updating the stencil area based on a determination, from the colour values of pixels within the input image, of likelihood values representing the likelihood of pixels belonging to an image area of interest, the likelihood value for each colour value being determined from a combination of the foreground and background colour histograms; and replacing the original colour values of pixels within the updated stencil area of the input image with replacement colour values; and a display, for displaying the image on which colour replacement processing has been conducted.

Viewed from another aspect, there is provided an image processing method, comprising the steps of:

imaging a scene to form an input image;

generating a depth map of the scene;

determining, from the depth map, an area of interest in the input image to which colour replacement processing can be applied;

identifying pixels within the area of interest of the input image having a colour value within a specified colour range;

replacing the colour value of each identified pixel with a replacement colour value;

generating an output image in which the replacement colour values are used for the identified pixels; and displaying the output image.

The depth information provided by the depth sensor can be used to exclude background objects from the colour replacement process, or to identify image features as being separate (because they are separated by an intervening image region at a different depth). This reduces the volume of data being processed and enables such processing to be conducted in real time at a visibly acceptable frame rate. In addition, the occurrence of colour replacement in relation to background objects is reduced or avoided.

The area of interest determined from the depth map may be a foreground area of the image within a predetermined range band from the depth camera. Alternatively, the area of interest determined from the depth map may be an area having certain surface profile characteristics. For example, a user's face may be depth profiled, and characteristic surface contours (eyes, nose, mouth etc.) identified and used to specify an area of interest to which colour replacement processing can be applied.

A step of calibrating the specified colour range to the colour distribution of an area of interest in the input image may be provided, wherein the area of interest used for colour calibration is based on the foreground area determined from the depth map.

Viewed from another aspect, there is provided an image processing apparatus, comprising:

a video camera for imaging a scene to form an input image;

a depth sensor for generating a depth map of the scene;

a processor, said processor being configured:

to determine, from the depth map, an area of interest in the input image to which colour alteration processing may be applied;

to identify pixels within the area of interest in the input image having a colour value within a specified colour range;

to replace the colour value of each identified pixel with a replacement colour value; and to generate an output image in which the replacement colour values are used for the identified pixels; and a display device for displaying the output image.

Viewed from another aspect, there is provided a method of calibrating a depth sensor with a first camera, the depth sensor being provided with a second camera pre-calibrated to the depth sensor, the method comprising:

imaging a scene in which a predetermined marker is visible using the first camera to form a first input image;

imaging the scene using the second camera to form a second input image;

detecting the position and orientation of the predetermined marker within the first input image and the second image respectively;

calculating a transform representing a difference in alignment between the first input image and the second input image based on the difference in the detected position and orientation of the predetermined marker within the first input image and the second input image; and mapping depth information captured by the depth sensor to image information captured by the first camera using the calculated transform.

This technique permits a depth camera to be calibrated to an RGB camera using a simple marker.

The transform may be averaged over a plurality of frames to improve accuracy.

A step of displaying alignment information to a user may be provided. This may be in the form of a visual indicator of a portion of the second input image considered to constitute a foreground area of the image based on the current transform, the foreground area being an area of the image determined to be within a predetermined range band with respect to the depth sensor and/or first camera. A step of terminating the calibration process in response to a user input and using the most recently generated transform in the mapping of depth information to image information can be provided. In this way, the user is able to terminate calibration when the accuracy of the transform is sufficient to accurately define the foreground area, as judged by the user. In effect, the visual alignment feedback triggering operator input is used to compensate for the inherent unreliability in the simple marker based transform calculations.

Viewed from another aspect, there is provided an apparatus, comprising:

a first camera;

a depth sensor having a second camera pre-calibrated to the depth sensor; and a processor for calibrating the depth sensor with the first camera, the processor being configured:

to receive from the first camera a first input image of a scene in which a predetermined marker is visible;

to receive from the second camera a second input image of the scene;

to detect the position and orientation of the predetermined marker within the first input image and the second image respectively;

to calculate a transform representing a difference in alignment between the first input image and the second input image based on the difference in the detected position and orientation of the predetermined marker within the first input image and the second input image; and to map depth information captured by the depth sensor to image information captured by the first camera using the calculated transform.

While the invention could be applied to still images, preferably the image is a video image.

Further aspects of the invention relate to a computer program and a storage medium storing the computer program.

BRIEF DESCRIPTION OF THE DRAWINGS

Embodiments of the present invention will now be described with reference to the following drawings, in which:

FIGS. 11A and 11B schematically illustrate the capture of facial features in a lip colour replacement technique;

FIG. 12 schematically illustrates an active contour technique for identifying a smooth outline for lip location;

DESCRIPTION OF THE EXAMPLE EMBODIMENTS

Figure 1:
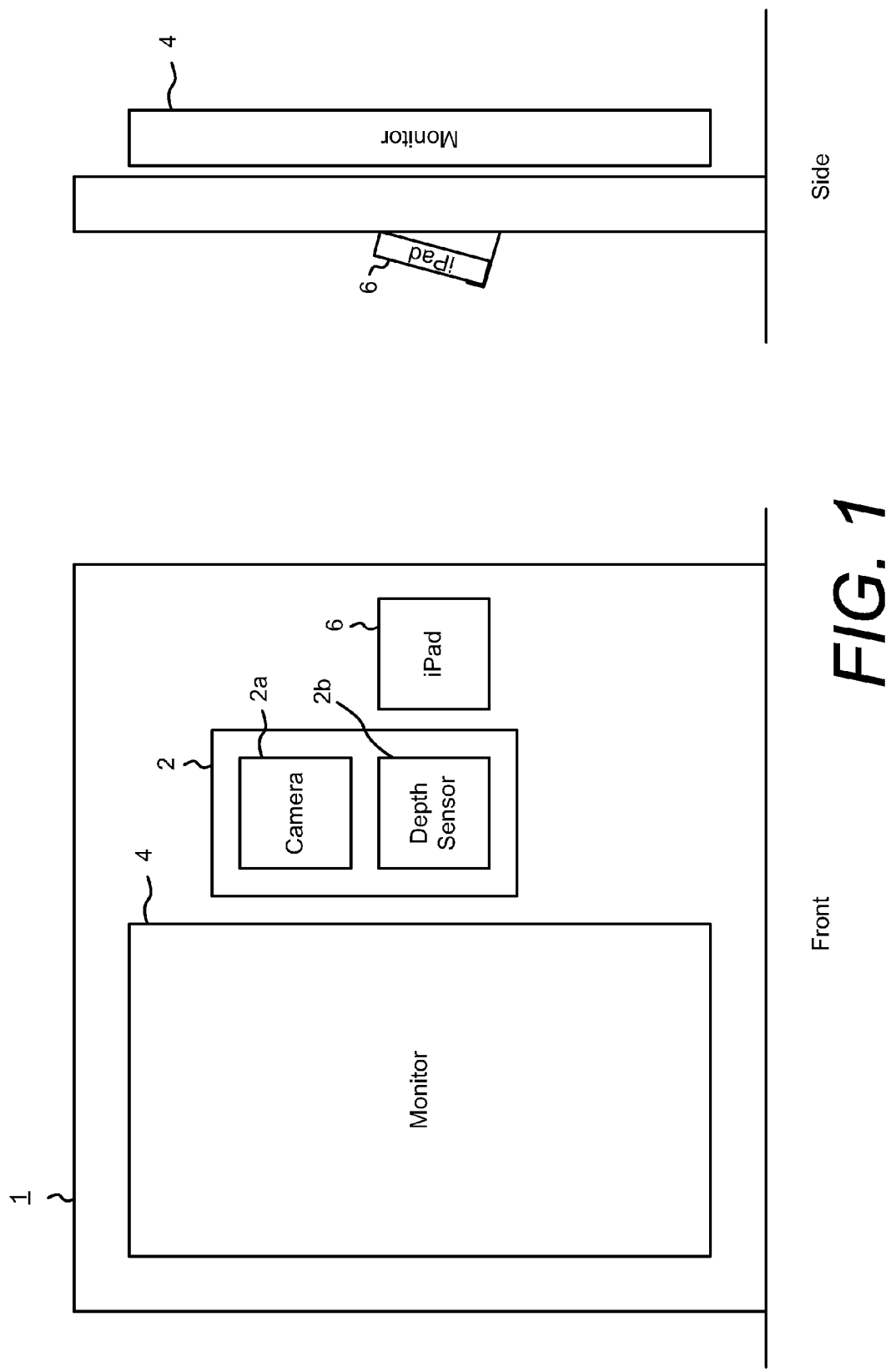
FIG. 1 schematically illustrates the mirror apparatus according to an embodiment of the invention.

Referring first to FIG. 1, an augmented mirror apparatus is schematically illustrated. FIG. 1 comprises a front view and a side view of the apparatus, and also a magnified view of the imaging components. The mirror apparatus comprises a sheet of mirrored glass behind which is mounted a 60" display screen. The imaging components comprise an RGB camera and a depth sensor. These are installed vertically in line to enable the portrait view of the customer on screen. The cameras are housed in a metal recessed cabinet along with the iPad device and positioned as shown in front of the mirrored glass.

Figure 2:
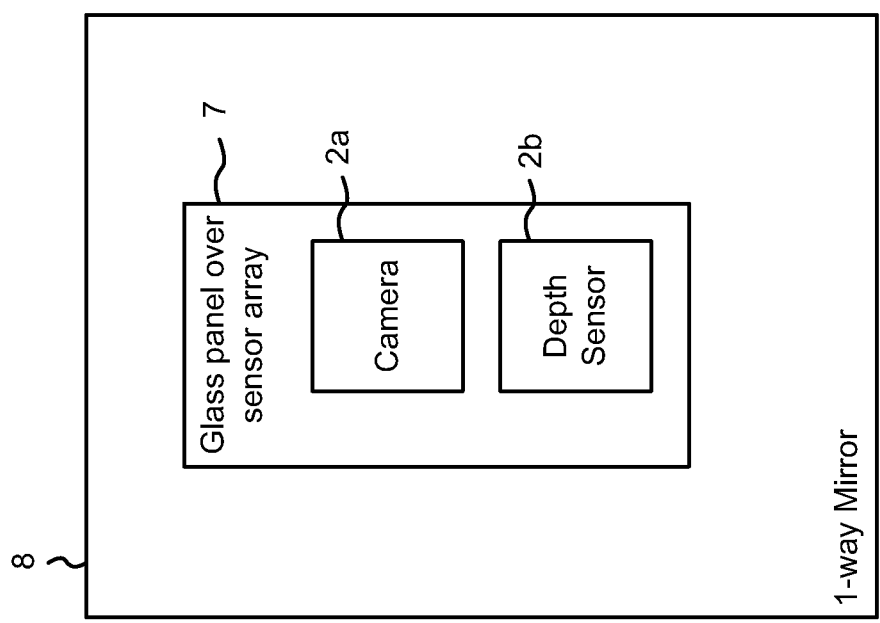
FIG. 2 schematically illustrates the imaging components of the mirror apparatus of FIG. 1.

In FIG. 2, the vertical arrangement of cameras is shown. The depth sensor comprises its own built in camera, which assists with registration between the high definition camera and the depth sensor itself. A clear glass panel is provided over the sensor array, both to protect the lenses, and for presentation purposes. Around the clear glass panel a one way mirror is provided to obscure other components of the system.

Figure 3:
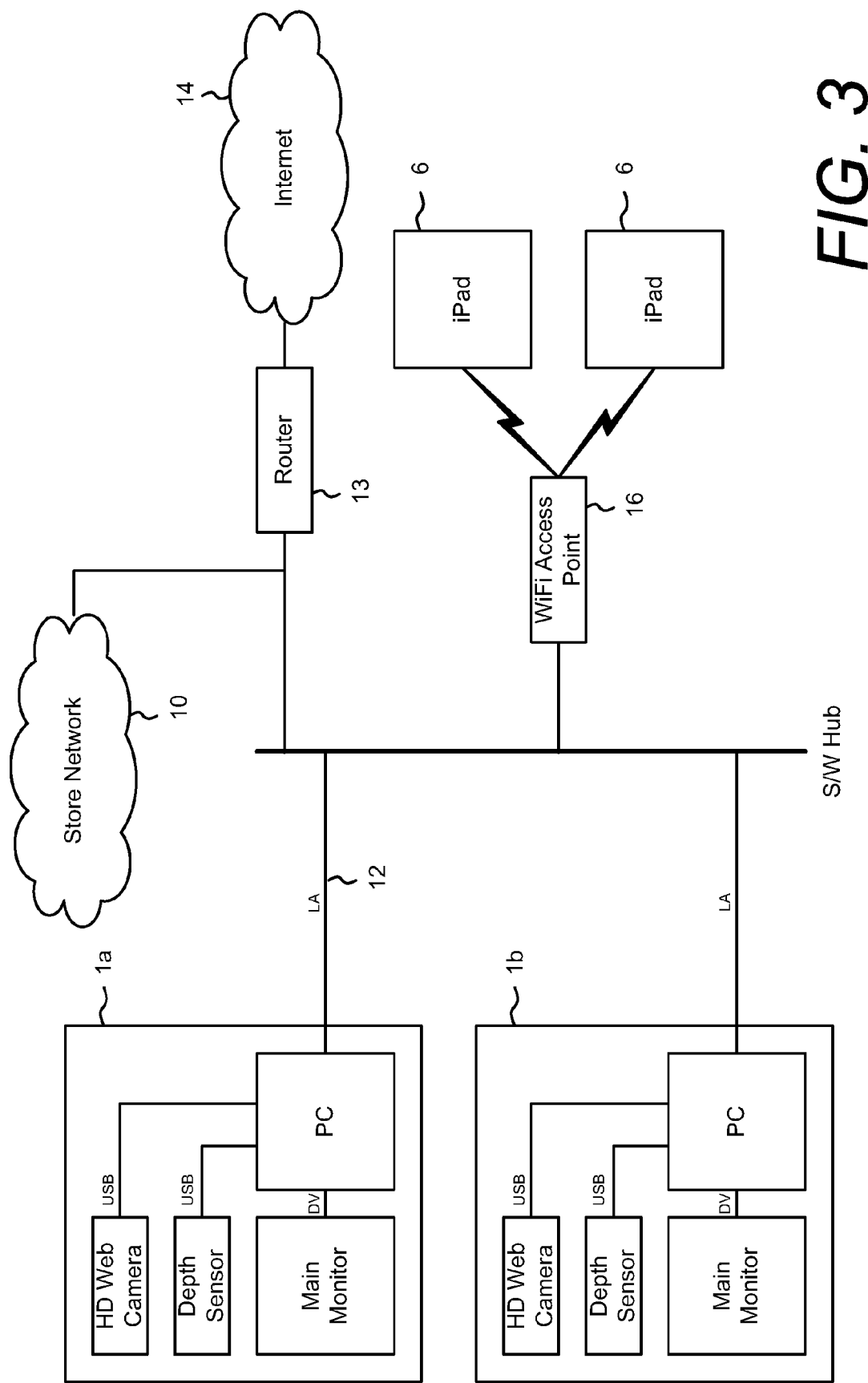
FIG. 3 schematically illustrates the system layout and network structure of the system of FIG. 1.

In FIG. 3, two mirror apparatuses are shown, which may be provided in different areas of a store. The mirror apparatuses are each connected to a store network via a Local Area Network (LAN). The mirror apparatuses are connected to the Internet via the LAN and a router. The iPads are connected to the mirror apparatuses wirelessly via a WiFi access point and the LAN. Briefly, the system layout and network structure comprises a main monitor (60 inch portrait mode) which is a Sharp, 1920×1080, 2000cd, a HP Z420 PC, an ASUS Xtion PRO LIVE depth sensor and a Microsoft Lifecam Studio 1080p HD Web Camera. An iPad is used as a touch panel tablet (9.7 inch portrait mode) to provide a user interface. It will of course be appreciated that alternative hardware could be used in the above cases. The HD web camera and depth sensor are each connected to their corresponding PC by a USB connection. The main monitor is connected to the PC via a DV (Digital Video) connection.

Figure 4:
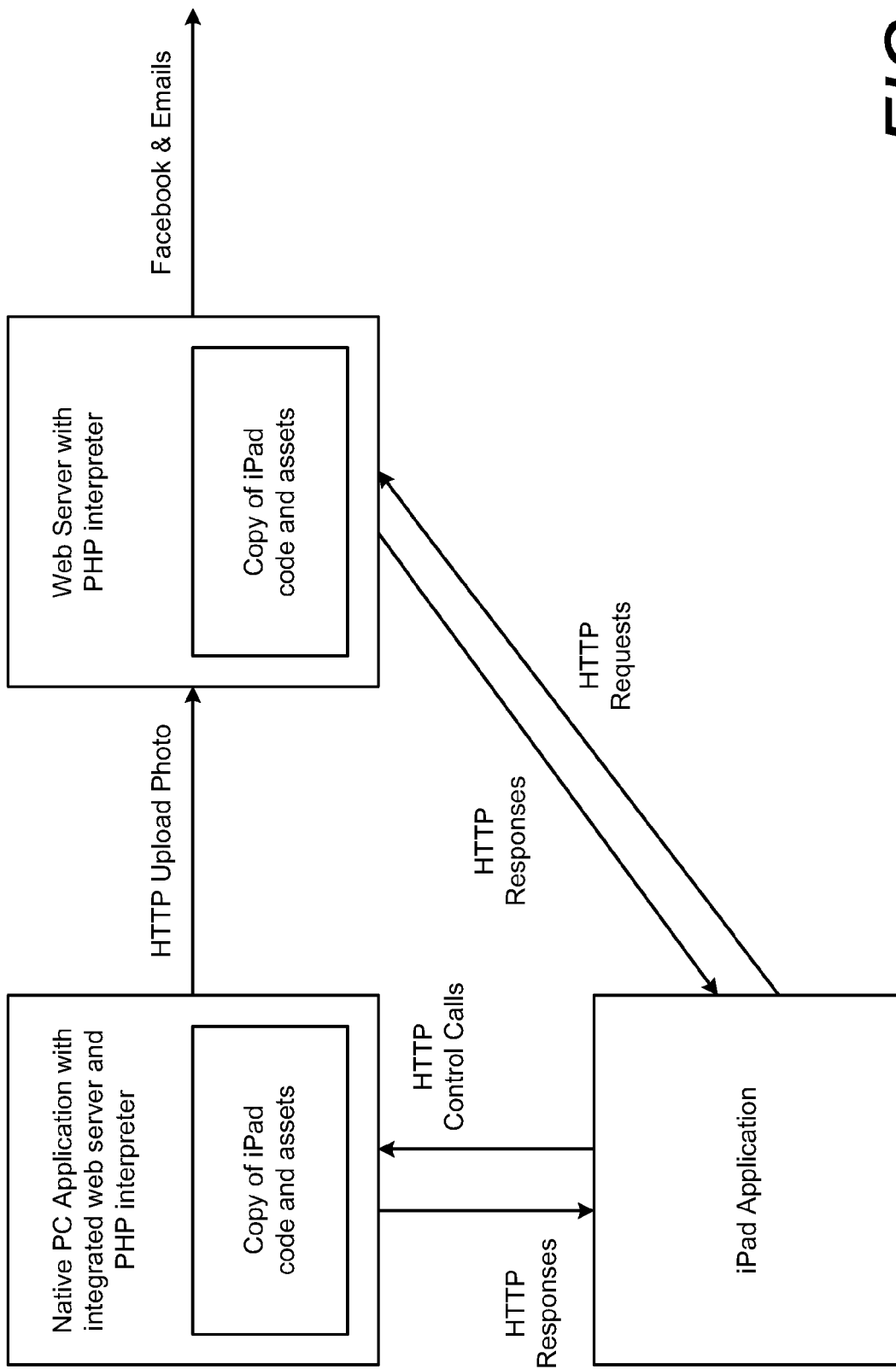
FIG. 4 is a schematic high level software communication diagram.

In FIG. 4, an iPad application is shown to communicate via HTTP calls and responses to and from a native PC application, and with a web server. The PC application has an integrated web server and PHP interpreter. It stores a complete copy of all iPad code and assets. These are maintained for offline usage in the event that Internet access is not available. The PC application uses HTTP to upload photos to the web server. The web server has a PHP interpreter and also stores a complete copy of all iPad code and assets. In this case they are available for online usage. The web server is operable to transmit the uploaded photos to facebook, or to send an email to a customer specified email address. All communication is carried out via a local wired and wireless router, which is in turn connected to the Internet.

In use, the mirror system uses a large portrait screen, depth sensor, rgb camera, iPad, PC computer, network router and remote server to enable customers to change the colour of specific items of (pre-calibrated/pre-determined) clothing. The system is present & runs behind the mirrored glass panel to give the impression of standing in front of a real mirror and trying on items of clothing. When a user stands in front of the Mirror apparatus, (in the pre-determined garment), they are given the option to select which item of clothing they are wearing. The user selects the product on the iPad screen which as shown as positioned to the side of the mirror. Once the product is selected they can then choose from a wide range of colours to visualise what shade looks best on them.

Immediately after the user has made their selection the colour will be displayed through a live real-time camera feed of the user (on screen) standing in front of the mirrored glass. The original pre-determined colour of the garment the user is wearing will be processed and the new target colour simulated and displayed. The user is then given the option to change the colour further or take a snapshot of themselves. If the user chooses to take a snapshot a countdown timer (5, 4, 3, 2, 1) will be displayed on the main portrait screen giving the user a chance to pose. Once the snapshot has been captured, the preview photo is displayed on the iPad screen. The user is then given two options: to post this picture to facebook or send to an email address of their choosing.

Whilst the system is not in use a screen saver video is displayed on both the iPad and on the main screen.

Figure 5:
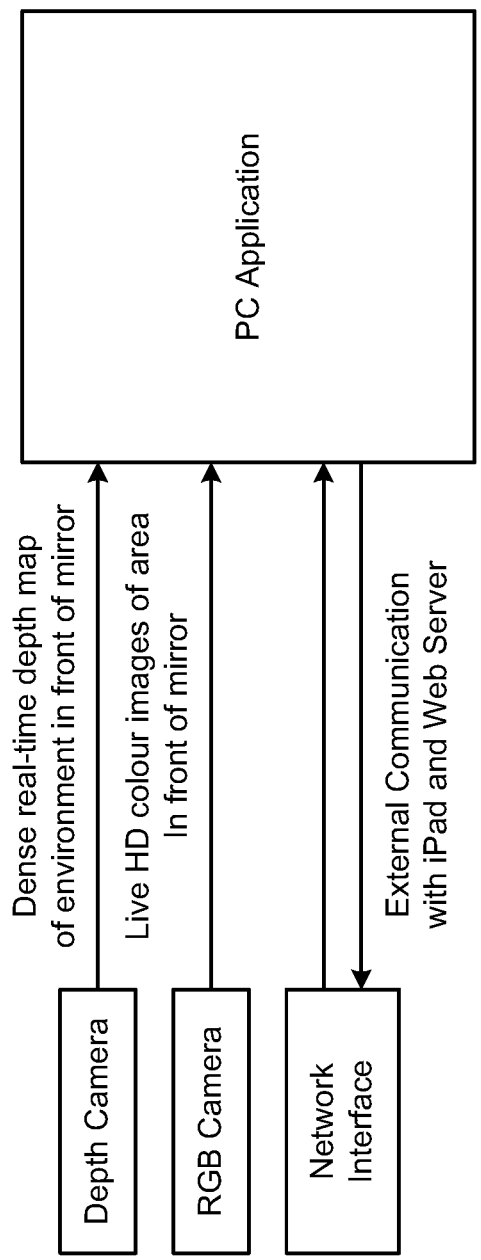
FIG. 5 is a schematic abstract high-level PC application diagram.

In FIG. 5, it can be seen that each of a depth camera and an RGB camera provide inputs to PC application software, in this case running on Windows 7. The depth camera outputs a dense real-time depth map of the environment in front of the mirror. The RGB camera outputs live HD colour images of the area in front of the mirror. The PC application software is in communication with a network interface which provides for external communication with the iPad and the web server. The iPad effectively provides a user interface for controlling the operation of the mirror apparatus.

The PC application is written in C++ for the Windows 7 OS. It has PHP5 installed along side for PHP integration. In broad terms, the PC application conducts the following functions:

1. The PC application obtains a dense depth map, at a resolution of 640×480 voxels, up to a range of 3 m (limit set in advance as maximum usage depth).

2. High resolution HD images of the area in front of the mirror are captured in real-time at a resolution of 1920×1080 pixels (1080p)

3. Control commands are received via the network stack, and images are uploaded to a web host.

Figure 6:
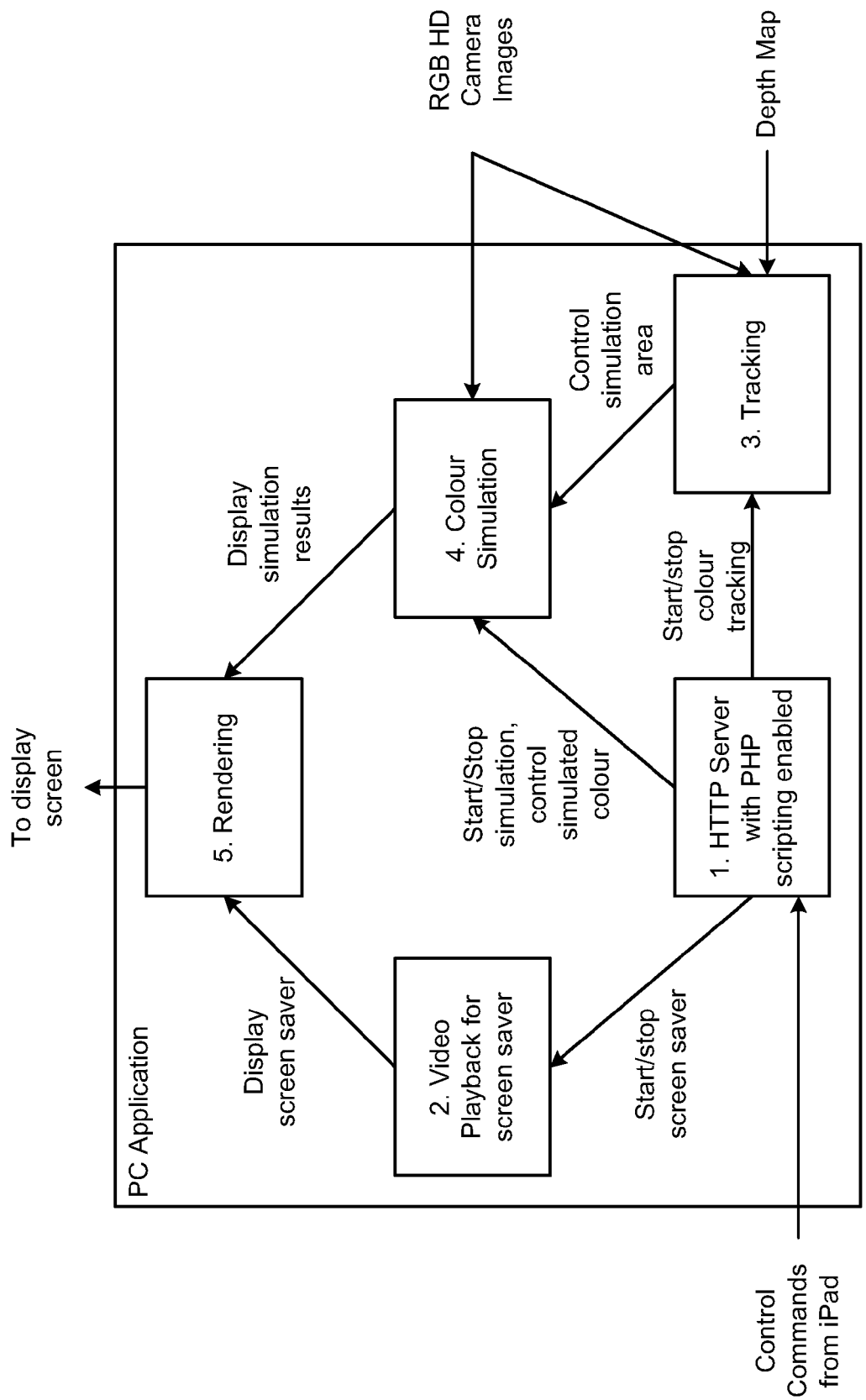
FIG. 6 is a schematic PC application component diagram.

In FIG. 6, the various components of the PC application can be seen. Control commands from the iPad are received at a HTTP server with PHP scripting enabled. This component provides start/stop tracking commands to a tracking component which tracks objects within the field of view of the camera. The tracking component also receives the depth map from the depth sensor and RGB HD camera images from the RGB camera. The tracking component identifies a simulation area within the field of view of the camera. This is passed to the colour simulation component to restrict the processing carried out by the colour simulation component to a particular area of an image frame in the RGB HD camera images (which are also provided to the colour simulation component). The colour simulation component is controlled by start/stop simulation commands, and commands controlling the colour to be simulated. The results of the simulation are provided to a rendering component, which renders the resulting frame (with colours altered) onto a display screen. When not in operation, a video playback component provides video playback for rendering on the display in a screensaver mode.

The PC application uses a 3D rendering engine called OGRE, but all rendering is done in 2D as flat composites. The HD compositing is undertaken on the graphics cards GPU to enable interactive frame rates.

The system has 2 display modes:
1. Calibration Mode—low resolution (480×640)—stretched for 16:9 screen.
2. Normal Operational Mode (1080×1920) 1080p in portrait orientation These modes are controlled by the iPad application. A different composite pipeline (where multiple layers of image processing are composited to form the output image) is used for each of these two modes. The screensaver runs within the normal operational mode.

HTTP Server Software Component

The PC application has an integrated web server component that enables it to communicate on a standard HTTP port of 8080. Files can be stored locally on disk and served up to the iPad, and can utilise PHP scripting. However, having the server integrated into the application means that it can intercept HTTP requests and use them as control commands from the iPad. By this technique the PC application is solely controlled by the iPad whilst in normal operational mode. During calibration a keyboard may also be used to set colours and save calibrations.

Video Playback Component for Screen Saver

The PC application combines a video playback functionality which can load a locally stored video file and send each frame to the rendering engine.

Tracking Software Component

Figure 7:
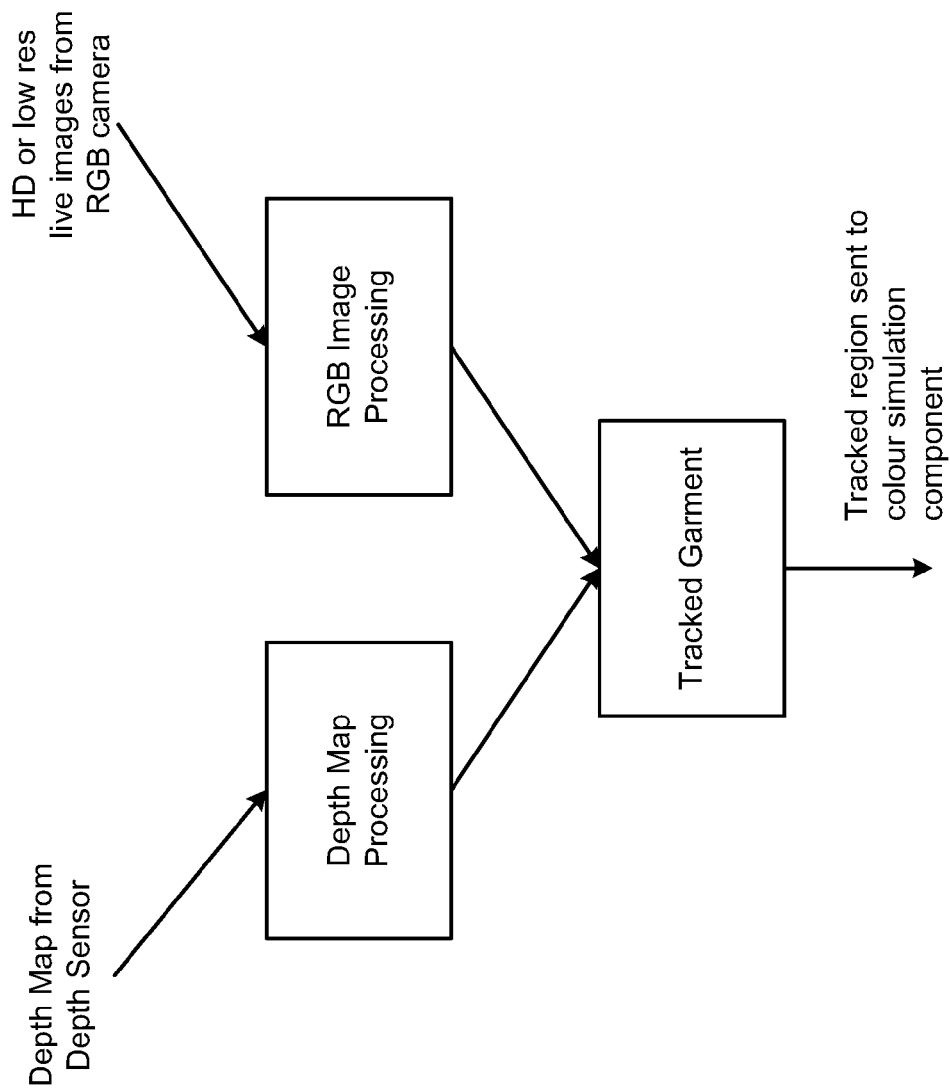
FIG. 7 is a schematic diagram of a tracking software component.

In FIG. 7, the tracking process is shown. In the tracking process a depth map is received from the depth sensor, and is subject to depth map processing (described below). In addition, HD or low res live images are received from the RGB camera, and are subject to RGB image processing. The results of the depth map processing and RGB image processing area used to track the location of the garment in the image. The tracked region of the image is then sent to the colour simulation component.

The tracking module runs in two modes: calibration and normal operational mode:
1. Calibration—The calibration mode sets the RGB camera to capture images at a lower resolution of 640×480.
2. Normal Operational Model—this mode sets the RGB camera to capture images at the highest resolution of 1920×1080.

The processing for the tracking component is carried out within two places on the PC, the CPU and GPU. During calibration and at lower resolution all processing is carried out on the CPU. During normal operation processing is carried out on both the GPU and CPU.

During normal operation mode some of the processing is undertaken on the GPU to enable the interactive frame rate of >10 frames per second (FPS). However due to the limitations of the GPU architecture some processing is still undertaken on the CPU.

Depth Map Processing

The system is set to limit the operational space of the Mirror apparatus to a maximum of 3 meters away from the glass. To achieve this, a depth sensor is used, which provides the software with realtime depth information in front of the mirror. It is first necessary to align the depth images to those coming from the RGB camera, as this is positioned just above the depth sensor. To obtain this alignment a calibration mode operation is conducted by using a simple visual marker & tracking technique, allowing the correct alignment to be calculated.

The depth sensor comes combined with its own RGB camera, although it can only operate at a low resolution of 640×480, which is not suitable for final rendering in operational mode. However, the in-built RGB camera of the depth sensor is pre-calibrated to the depth map. So it becomes possible to use the transform matrix M1 found by tracking the image of the marker in this RGB camera to the transform matrix M2 found by tracking the same marker in the images of the HD camera. In other words, by comparing the two image outputs (the HD camera and the built in camera), it is possible to correct for a difference in alignment between the depth sensor (which is pre-aligned with its in-built camera) and the HD camera.

Figure 10:
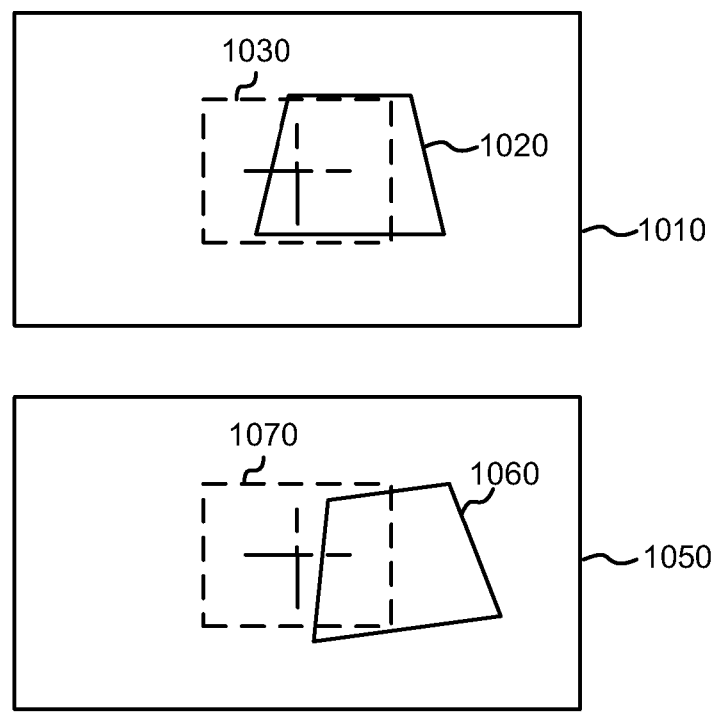
FIG. 10 schematically illustrates a technique for calibrating a depth sensor to a camera.

This process is graphically illustrated in FIG. 10, which schematically illustrates the slightly different views of the same scene imaged by the RGB component of the depth camera, and the HD RGB camera. In particular, an image 1010 generated by the RGB camera of the depth camera shown at the top of FIG. 10 illustrates the position and orientation of a marker 1020 within the image 1010, and it can be seen that the marker 1020 is both rotated out of the plan of the image and displaced from the centre of the image. The reference marker position 1030 shows by contrast the same marker within the plane of the image 1010 and centred. Similarly, an image 1050 generated by the HD RGB camera and shown at the bottom of FIG. 10 shows the position and orientation of a marker 1060 within the image 1050, and it can be seen that the marker 1060 is both rotated out of the plan of the image and displaced from the centre of the image. The reference marker position 1070 shows by contrast the same marker within the plane of the image 1050 and centred. The transform M1 is generated by calculating the distortion (displacement and rotation in 3D) of the imaged marker 1020 with respect to the reference marker position 1030. The transform M2 is generated by calculating the distortion (displacement and rotation in 3D) of the imaged marker 1060 with respect to the reference marker position 1070. The transforms M1 and M2 may be determined by detecting the edges of the markers 1020 and 1060, identifying the corner positions of the markers 1020 and 1060 from the intersections of the detected edges, and calculating the transform matrix from the identified corner positions with respect to the centre of projection of the reference marker positions 1030 and 1070. The resulting transform may be represented as a 4×4 transform matrix.

The final transform matrix M3 that maps points from HD RGB image to their respective depths in the depth map is found as follows:

$$M3=\text{inv}(\text{inv}(M2)*M1)$$

Where inv(x) is the matrix inverse.

Therefore a system operator must stand in front of the mirror holding out a marker. As each frame is captured the above formula is used to calculate the transform. To remove noisy data a simple moving average (e.g. exponential smoothing) is used for M3. Once satisfied (on screen alignment information is presented) the operator can save the results. The alignment information may be a visual indicator of a portion of the currently captured image considered to constitute a foreground area of the image based on the current transform. This could be achieved by artificially colouring either the foreground or background area of the image. The foreground area may be defined as an area of the image determined to be within a predetermined range band with respect to the depth sensor and/or the RGB camera based on the current transform. The operator may feel satisfied that the transform is accurate once the visual indicator corresponds only to the area the operator considers to be the foreground area, which may be the operator himself, and the marker he is holding. For example, the background area surrounding the operator might be replaced by or augmented with a colour, leaving only the operator and the marker untouched. Alternatively, the background area might be left untouched and the foreground area corresponding to the operator and the marker augmented with a colour.

Because operator input (rather than automated techniques) is used to identify when adequate alignment has been achieved, a simple marker can be used. Once this transform has been obtained it is used in normal operational mode. So as each new depth map is captured each depth value is transformed into RGB HD camera space, and a binary image is produced, where a 0 represents those regions that are either more than 3 meters away or less than 0.7 meters from the depth sensor (its operational limit).

However this transformation can be processor intensive using a single thread, and lends itself well to parallelisation. Therefore, multiple threads are used to process this map for each frame during normal operational mode. The simple transform calculation is as follows:

$$pRGB=M3*p\text{Depth}$$

Where pRGB is the depth for the HD RGB pixels found from the pDepth of each voxel returned by the depth sensor. pRGB can therefore be found for different pixels in parallel.

To remove noise from the data a simple morphological dilation operation is used on the binary map to fill holes in the data, and compensate for inaccuracies in the alignment. The binary depth map that is outputted from this processing is then passed to the tracked garment component.

RGB Image Processing

Figure 8:
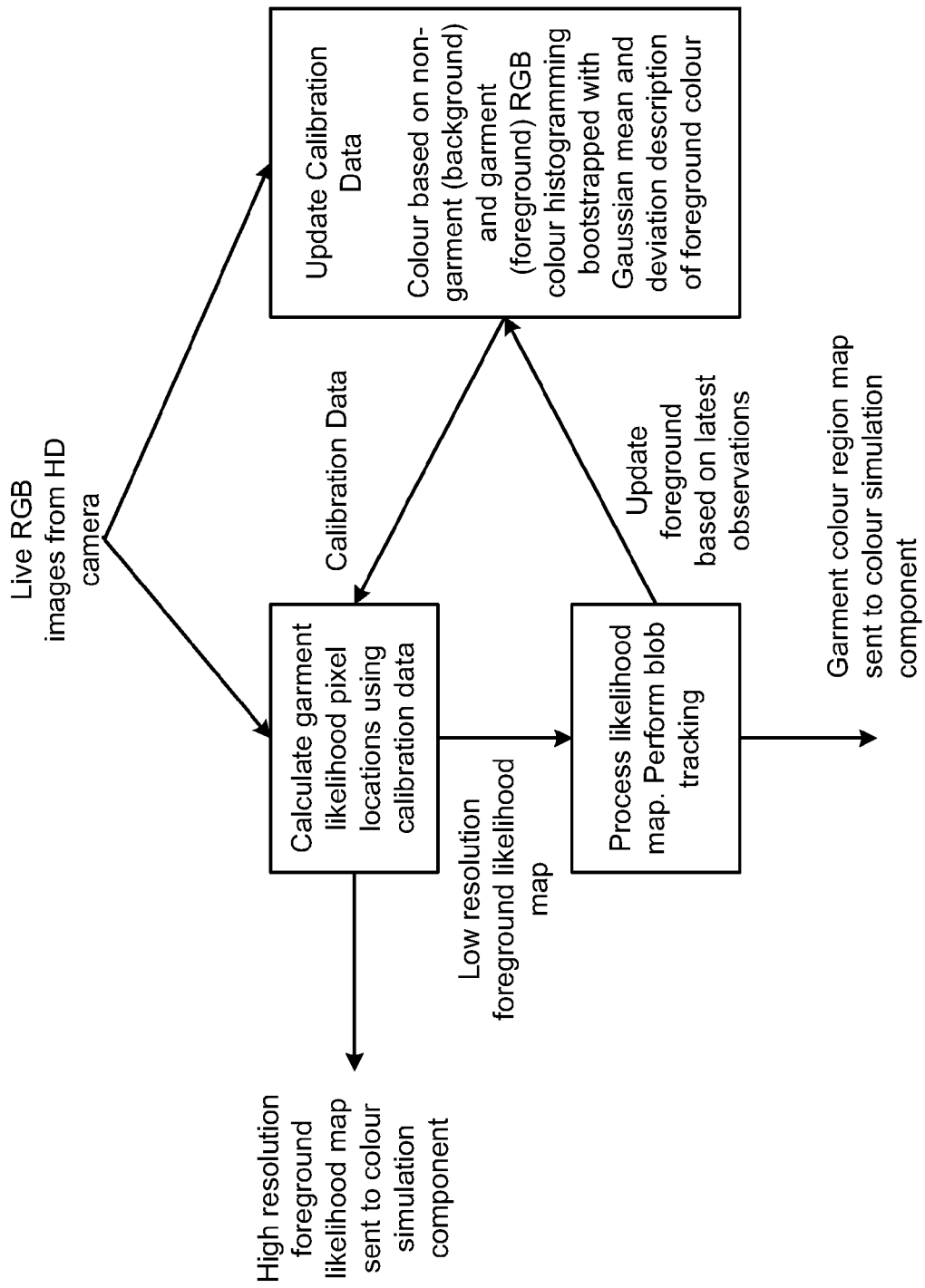
FIG. 8 schematically illustrates the RGB processing function.

In FIG. 8, RGB image processing is described. In particular, live RGB images are received from the HD camera. In one branch these are used to update the calibration data. Here, the colour is based on non-garment (background) and garment (foreground) colour histogramming bootstrapped with a Gaussian mean and deviation description of the foreground colour. While this embodiment uses RGB colour space, other colour spaces may be used, such as YCbCr, which represents colours in terms of a luminance value Y and two colour difference values Cb and Cr. For certain colour spaces, for example but not limited to YCbCr, the bootstrapping may not be required. In this case the calibration data may be generated purely on the basis of the foreground and background colour histograms.

The calibration data is used (along with the RGB image data) to calculate garment likelihood pixel locations—i.e. pixel locations at which the garment is determined to be likely to be present. The outputs of this process are a high resolution foreground likelihood map which is sent to the colour simulation component, and a low resolution foreground likelihood map which is processed to perform blob tracking. The foreground estimate is then updated based on the latest observations arising from the processing of the likelihood map and blob tracking, and is used to update the calibration data. Also resulting from the processing of the likelihood map and the blob tracking is a garment colour region map, which is sent to the colour simulation component.

Garment Likelihood Map Processing

The garment likelihood map is found by using three RGB (0-255) colour histograms. Each histogram is a cubed (3D)

histogram in RGB space, and represents the distribution of colours appearing in received video frames. If YCbCr colour space is used, then it is possible to ignore the luminance component and map pixel occurrences to the colour histograms based only on their CbCr (colour difference) components. In this case each histogram is a two-dimensional histogram. The histograms are accumulative, in that they represent data from multiple successive video frames. The three histograms are as follows:

1. Background colours histogram
2. Foreground (garment) colours histogram
3. Combined and bootstrapped with Bayesian, or alternative statistical, runtime foreground histogram model The background histogram contains the likelihood of each colour value belonging to the background and not garment (foreground). The foreground histogram conversely contains the likelihood of each colour value belonging to the garment. The combined histogram is a Bayesian Likelihood, or alternative statistical model, combination of the above two histograms combined with a foreground Gaussian RGB colour model. The combined histogram can be represented as a lookup table indicating a likelihood of each colour value occurring in a foreground object within the scene, the likelihoods being determined from a Bayesian, or alternative statistical model, combination of the foreground and background histograms (optionally combined with the foreground Gaussian RGB colour model).

In order to generate the Gaussian model, one possible bootstrap method processes the foreground histogram to find the mean colour values and the spread within the RGB colour space using principal component analysis (PCA) to find the best possible axial alignment,—not necessarily aligned to the RGB vectors.

Where the above bootstrap model is to be used, the combined histogram is calculated by finding the likelihood distance, in the above case a Mahalanobis distance of each RGB value from the model describing the foreground colours histogram and multiplying this by the Bayesian, or alternative statistical model, combination of the two foreground and background histograms.

$$RGB(x)=((F(x)/Ft)*G(x))/((F(x)/Ft)+(B(x)/Bt));$$

Where $RGB(x)$ is the RGB likelihood of a RGB value belonging to the garment.
$F(x)$ is the foreground histogram accumulative result. $Ft$ is the total number of accumulative results in the foreground histogram.
$B(x)$ is the background histogram accumulative result. $Bt$ is the total number of accumulative results in the background histogram.

Optionally the foreground and background histograms may be normalised by dividing the number of accumulated occurrences of a given colour by the number of frames over which the histogram has been generated.

$G(x)$ is based on the Mahalanobis distance of the RGB value from the Gaussian model. As described above, the Gaussian model is found by performing Principle Component Analysis on the foreground histogram. This results in a colour distribution model which is not necessarily aligned with RGB space. $G(x)$ takes on a value of between zero (0) and one (1). In particular, an RGB value x which is relatively far away from the mean of the Gaussian model, as determined by the Mahalanobis distance, has a $G(x)$ value at or near zero, while an RGB value x which it relatively close to the mean of the Gaussian model, as determined by the Mahalonobis distance, has a $G(x)$ value at or near one. This serves to focus the combined histogram towards the colour space of interest, as represented by the Gaussian model. The benefit of this is that a colour which appears relatively frequently within the foreground area but which is very distant in colour space from the bulk of the foreground colours will be de-emphasised, and thus less likely to be subject to colour replacement. In other words, pixels having a colour other than the main foreground colours will have a reduced likelihood of being considered as part of the foreground.

The value of $G(x)$ can be arrived at in a number of ways. In one example, the following technique is used:

$x$=Mahanalobis distance in standard deviations from the mean of the Gaussian model/(Max Standard Deviations–set manually per installation–normally around 3)

if $(x>1)$, $G(x)=1$;
else $G(x)=1-x$

In an alternative embodiment in which the Gaussian model bootstrap is not used, the combined histogram may be calculated on the basis of the simpler expression:

$$RGB(x)=(F(x)/Ft)/((F(x)/Ft)+(B(x)/Bt))$$

Or, if using a YCbCr colour definition:

$$CbCr(x)=(F(x)/Ft)/((F(x)/Ft)+(B(x)/Bt))$$

Noting that the luminance value Y is ignored.

As a further alternative, the Gaussian model could be replaced with an alternative distribution model, such as a Laplace distribution, or a custom model could be provided using multiple Gaussian models for example.

Processing the Likelihood Map and Blob Tracking

Processing the live RGB data is undertaken in two places: the GPU and CPU. A low resolution, resized version of the HD high-res image is processed quickly on the CPU, whilst the original high-res version is processed on the GPU. For each new frame that is received from the RGB camera, it is processed to find the foreground colour area using the existing histograms/Gaussian model. This is then processed (morphological and floodfill operations as described below) and then used as the stencil to further train the histograms.

Morphological dilations and erosions are performed on the resultant probability maps, both on the GPU and CPU to remove noise and close holes in the data.

The thresholded probability map is then subjected to a series of opening and closing morphological operations—this both removes small outliers and fills small holes in the map. This process also spreads the map slightly, by 1 or 2 pixels (manually adjusted) to help the learning rate of the histograms during the training phase—the effect is that it spreads the stencil slightly beyond the found map to include extra colours not currently in the foreground histogram.

In the low resolution version additional CPU processing is done to identify a contiguous region. This is possible because the CPU is capable of more functions than the GPU. In particular, a flood fill algorithm is used to find large co-located regions in the map, and all other smaller areas are discarded. The final blob map is sent to the GPU and combined with the high resolution probability map. Again, small outliers, or unconnected areas of the image, are removed.

The floodfill algorithm is used to pick out the largest blob centred on previous centroid. And as stated, if a blob cannot be found at the centre, a search is made out in both directions to find adjacent blobs. Further blobs may also be included by searching left and right, as long as they are above a minimum size.

Figure 9:
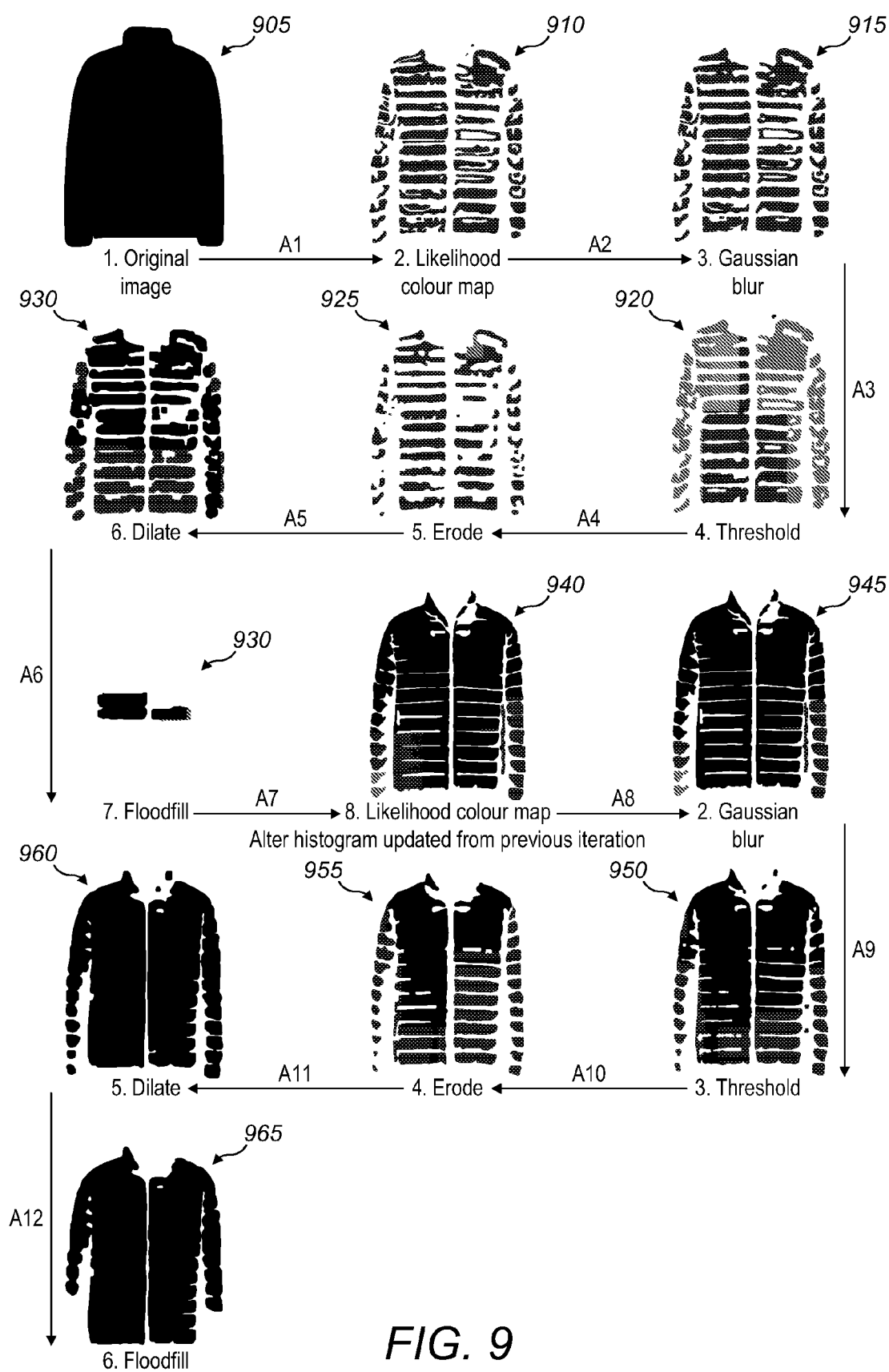
FIG. 9 schematically illustrates the processing of an input image in accordance with one embodiment.

An example of the above described processes is described in FIG. 9. At a step A1, each pixel of an original captured image 905 is compared with a colour lookup table representing the combined histogram and replaced with a likelihood value between 0 and 1 representing the likelihood of that pixel being part of the foreground. This results in the likelihood colour map 910. At a step A2, the likelihood colour map 910 is then subject to a Gaussian blur operation to result in a blurred map 915. At a step A3, each likelihood value in the blurred likelihood colour map is then compared with a threshold value, for example 0.3, and is replaced with a binary value of "1" if the likelihood value exceeds or matches the threshold value and a binary value of "0" otherwise, resulting in a binary map 920. The probability map is thresholded at an 'appropriate' level to capture foreground—this may be manually set for the environment. At a step A4, a morphological erode operation is conducted to remove noise from the binary map, resulting in an eroded map 925. Then, at a step A5, a morphological dilate operation is conducted to fill in gaps in the map, resulting in a cleaned up binary map 930. While in this example a single erode operation and a single dilate operation are used, in alternative embodiments a different set of morphological operations is envisaged. In one embodiment a first erode operation is used to remove noise, a series of (for example 3) dilate operations are used to fill in gaps, and a second erode operation is used to bring the blob boundaries in the binary map closer to their pre-morphological positions.

The binary map 930 is then subject to a flood fill operation at a step A6, starting at or near either the centre of the image or the centroid of the binary map foreground areas generated in relation to the previous RGB image. Only large contiguous areas of the binary map 930 are filled, resulting in a new foreground area (dark region in map 935) to be used to form a stencil defining the foreground and background areas for populating the foreground and background histograms.

Once the foreground and background histograms have been updated with the new values obtained from the updated stencil based on the map 935, a new combined histogram is generated, resulting in a new colour lookup table. As a result of the above steps A1 to A6, the new combined histogram should be more closely aligned with the colour of the garment being imaged. As a result, when at a step A7 a new likelihood colour map 940 is generated in a similar manner to the step A1, this can be seen to provide a much stronger result than in the step A1. A Gaussian blur operation is conducted on the colour map 940 at a step A8 in a like manner to the step A2, resulting in a blurred map 945. The blurred map 945 is then subject to thresholding operation at a step A9 in a like manner to the step A3 to result in a binary map 950. The binary map 950 is then subject to an erode operation at a step A10 and a dilate operation at a step A11 to result in the binary maps 955 and 960 respectively. The binary map 960 is then subject to a floodfill operation at a step A12 in a similar manner to the step A6, resulting in a new stencil for defining new foreground and background histograms. This process can continue until the foreground area stabilises to match the garment being imaged.

This process results in a lookup table which can be used in colour replacement processing by "looking up" whether a particular pixel is deemed (by virtue of its colour) to be part of the foreground, or part of the background. In other words, the lookup table is used in the context of colour calibration to set a stencil for updating the histograms, and in the context of colour replacement processing to set a stencil for selecting pixel locations at which a colour change operation is to be applied. The same stencil can be used both as an input to colour replacement processing, and also as an input to colour calibration. This is likely to be the case during realtime operation, in which colour replacement occurs every image frame, but colour calibration occurs for only a subset of the frames (e.g. every $10^{th}$ frame) in order to compensate for changes in lighting conditions.

Updating Calibration Data

The calibration data is updated in two separate phases.
1. In calibration mode, where the colour space is initially and broadly defined by an operator in low resolution mode.
2. In normal operational mode, where the colour space is continually updated to adjust to changes in lighting conditions.

During the calibration phase the operator must stand in front of the mirror wearing the target garment. The system initialises a square region in the centre of the screen as a seed point, and uses this as its starting region for the garment—this region is used as a stencil to update the foreground and background histograms—before the combined histogram is updated. In an alternative embodiment, instead of initialising a square region as a seed, an input image is obtained, and the operator is required to trace around the garment location in the input image. This results in a much more rapid acquisition of an accurate colour space representing the garment. As each frame is captured they are processed to find the garment probability map (and subsequently the tracked blob map—used as a stencil for the next update) from the previous frames addition to the histograms, and the Gaussian model recalculated. The blob region will then expand to fill a colour region that spans only a few standard deviations of the Gaussian bootstrap model, or alternative statistical model, and will come to stabilise after a few seconds (<60 s) of operation.

All of the above process lends itself well to parallelisation, and multiple threads are used to speed up the process on the CPU at low resolution. Once the operator is satisfied that the garment has been suitably acquired, the combined runtime probability histogram is recalculated. To account for varying lighting conditions, during normal operation this process above is carried out at set intervals, say every tenth frame, and the Gaussian model adjusted according.

Colour Simulation Software Component

The colour simulation is undertaken completely on the GPU. The foreground likelihood map is passed to a CG shader on the graphics card which processes all the pixels that coincide with the discovered foreground region. To speed up the run-time processes a preprocessed combined probability histogram is created from the foreground, background and statistical bootstrap models using the defined formula.

The formula for the colour changing algorithm uses a target colour and brightness tRtGtB+tL, specified by the iPad application.

To create a smooth edge a blur effect is applied to the foreground binary region, which is then converted to a floating point value R between 0 and 1.

For each pixel that is colour changed the following steps are performed:

1. Find the average RGB intensity of that pixel of the HD camera image:

$$cI=(cR+cG+cB)/3$$

2. Add the brightness component to the intensity, where the brightness tL ranges from −0.5 to 0.5

$$cI=\text{clamp}(cI+tL,0,1)$$

Where Clamp(x) ensure the resultant intensity remains in the range 0-1

However the brightness is adjusted for those areas near the edge, to reduce the contrast along the edge, so the above formula becomes:

$$cI=\text{clamp}(cI+(tL*R\textasciicircum 2),0,1)$$

Where R is the per pixel region value, which will fade to zero along the edges due to the blur pass described above.
3. To reduce the contrast further along the edges the target colour is adjusted along the faded edge as follows:

$$tRtGtB=(tRtGtB*R\textasciicircum 4)+(cRcGcB*(1-R\textasciicircum 4))$$

4. To enable bright highlights the colour changing algorithm applies a different formula to brighter pixels, return the target colour oRoGoB as follows:
if (cI<0.5)

$$oRoGoB=(cI*tRtgtB)*2$$

otherwise $$oRoGoB=1-(2*(1-cRcGcB)*(1-tRtGtB))$$

5. And finally the output colour is adjusted along the edge to blend with the underlying colour of the HD camera image, so the above resultant oRoGoB values are adjusted:

$$oRoGoB=(oRoGoB*R\textasciicircum 2)+((1-R\textasciicircum 2)*cRcGcB)$$

To summarise:
  A colour histogram of foreground and background based on a calibration dataset (taken live) is generated, optionally boot strapped with a non-axial aligned Gaussian foreground colour space probability;
  The data generated by this step is used to determine which areas of the image are foreground and background;
  This is combined with the data received from the depth sensor and is used to cut off distant and unconnected objects; and
  only the remaining (desired) objects are subject to colour change.

The overall process can be considered in 3 main stages. The first stage is the calibration of the depth camera sensor with the HD RGB camera. This stage needs take place only once, on installation. The second stage is to calibrate the colour lookup table to a worn garment. The main calibration process need only be conducted once, but an ongoing calibration process which operates in the same manner as the initial calibration process but at a less frequent rate, will continue on during the third stage of operation in order to compensate for time varying changes in lighting conditions. The third stage is the colour replacement processing itself, in which the existing colour of a garment is replaced with a new colour, with the pixel positions of the existing garment being identified using the calibrated colour lookup table.

Figure 13:
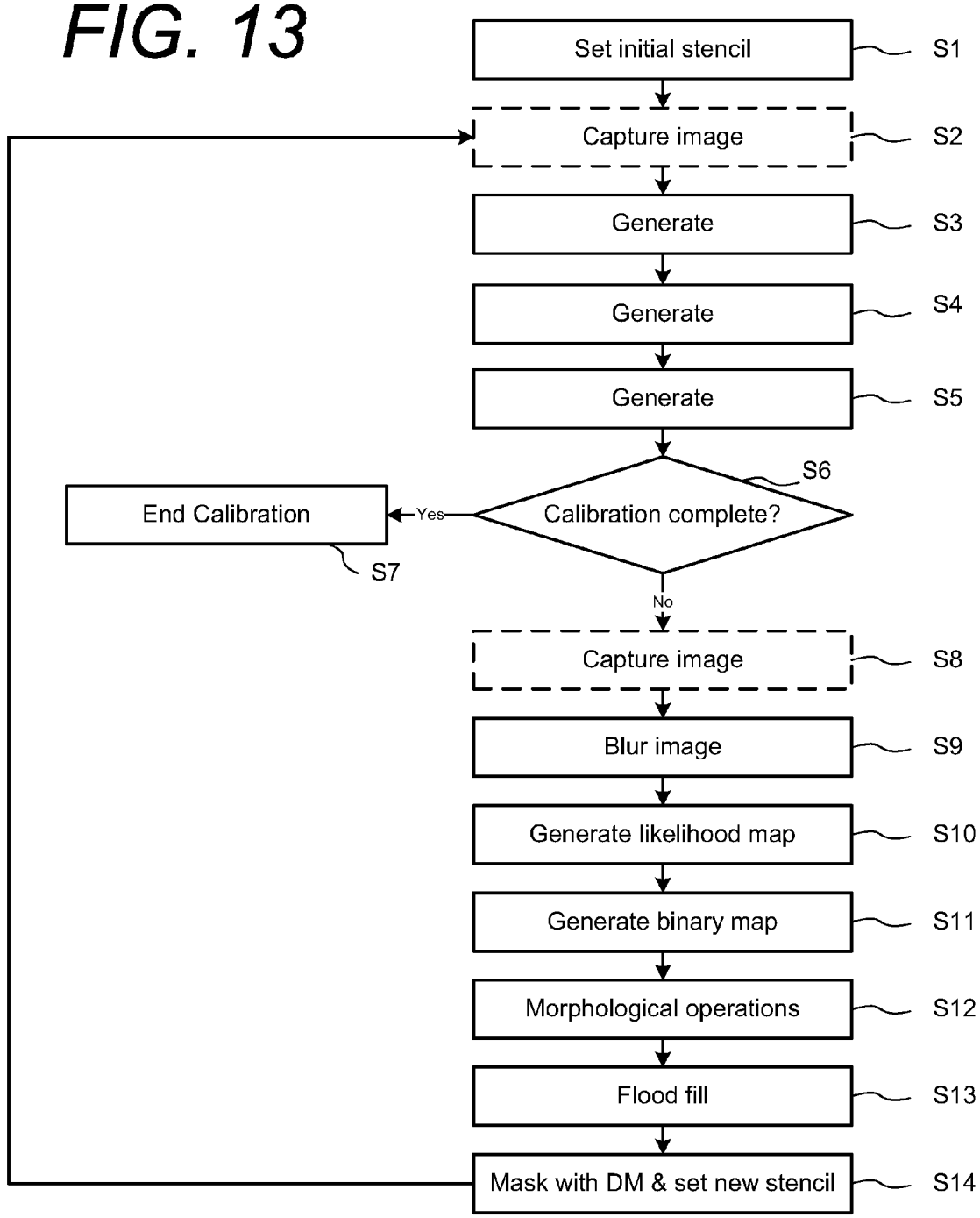
FIG. 13 schematically illustrates a colour calibration process.

A summary of the colour calibration process is provided schematically in FIG. 13. Specifically, at a step S1 an initial stencil is set. This may be a small square in the centre of an input image, or a traced area corresponding to the garment entered by an operator. In some circumstances it might also be possible to use an incoming depth map to define one or both of the position and extent of an initial stencil area. At a step S2, an image is captured. At a step S3, foreground and background histograms of the colour value distribution in the stencil area (foreground) and outside the stencil area (background) are populated. For the first image frame the histograms will be generated/populated for the first time. At a step S4, optionally a Gaussian model or alternative statistical model will be generated from the distribution of colour values present in the foreground histogram. This can be achieved using principal component analysis, and the model will define a mean colour value for the foreground histogram, and a standard deviation of the colour distribution in the foreground histogram with respect to the mean. As explained previously, in some applications, and for some colour spaces, it may not be necessary to bootstrap the combined histogram. In these cases the step S4 will not be conducted. At a step S5, a combined histogram is generated based on the foreground and background histograms, optionally biased based on the distance between colour values and the mean of the Gaussian model generated at the step S4. At a step S6 it is determined whether the calibration process is complete. The calibration process may be considered complete either after a predetermined period of time has passed, or once the combined histogram (lookup table) has stabilised—i.e. is no longer changing significantly between iterations. If calibration is complete then the calibration process ends at a step S7.

If on the other hand calibration is not complete, then the process moves on to a step S8, where another image is captured. It should be noted that this step may in some cases be optional, since it would be possible to continue to "train" the colour space based on the same image frame. At a step S9 the image (either the image captured at the step S2, or the image captured at the step S8) is subject to a blur operation to remove noise. The blurred image is then used to generate a foreground likelihood map at a step S10, by passing each pixel colour value through the colour lookup table (combined histogram) to obtain a corresponding likelihood of that pixel (based on its colour) being part of the foreground (garment). The likelihood is represented as a value between 0 and 1. At a step S11 a binary map is generated from the foreground likelihood map by comparing each likelihood value with a threshold value. This will result in a binary map in which a value of "1" indicates that the pixel is deemed to belong to the foreground and "0" indicates that the pixel is deemed to belong to the background. It will be appreciated that the values of "0" and "1" could of course be reversed. The binary map is then subject to a series of morphological operations at a step S12, as described above with reference to FIG. 9. Then, at a step S13 a flood fill operation is used to identify foreground blobs within the binary map which are comprise at least a minimum predetermined number of contiguous pixels. One or more such blobs may be identified. The flood fill operation may start at the centroid of the foreground regions of the depth map. Where the centroid coincides with a foreground region than the initial flood fill can start from that point. Where the centroid does not coincide with a foreground region then the process may look both left and right of the centroid for a predetermined distance or across the whole image and conduct a flood fill on any blob found, or on any blob having a width greater than a predetermined width threshold. Similarly, starting from each blob for which the flood fill operation identifies the blob to be of at least the minimum required size, a search of the depth map for further blobs within a predetermined distance (horizontally or vertically) of that blob may be made, and a flood fill conducted of those blobs too. The result of this process will be to remove from the depth map any small blobs, or blobs which are distant from the garment area. At a step S14, a depth map generated by the depth camera is used to mask the binary map to remove any regions which are outside of a depth range defined to relate to the foreground. This can be achieved by conducting an AND operation on the binary map generated from the likelihood map and a binary map generated from the depth map (in which a value of "1" would be used to denote a pixel within a predetermined depth range considered to relate to the foreground). It should be understood that the depth map could be applied at an earlier stage in processing if desired, such as before the flood fill operation, or even earlier—although applying the depth map before the blur and/or morphological operations would risk those operations re-extending the clipped image beyond the extent of the foreground area defined by the depth map. In any case, the resulting updated stencil is then passed back to the step S3 where it is used to specify the image areas for populating the foreground and background histograms. The steps S4 and S5 will be repeated using the updated histograms, resulting in a new combined histogram based on the updated stencil. The histograms are not refreshed each image frame, but instead are accumulated—with the occurrences of colour values inside and outside the stencil area of the current frame being added to the existing values in the foreground and histograms respectively. In one optional variation, the occurrences of colour values inside the stencil area of the current frame may be subtracted from the background histogram as well as being added to the foreground history. In other words, if a given RGB value 128, 94, 224 occurs 57 times in the stencil area, the value of 57 may be added to the 128, 94, 224 RGB entry in the foreground histogram and also subtracted from the 128, 94, 224 RGB entry in the background histogram. This may serve to speed up the calibration process by promoting that particular colour value in the combined histogram generated from the foreground and background histograms. It will be appreciated that the subtraction made from the background histogram in this case may not be the exact number of occurrences in the stencil area, but may instead be a function of it—e.g. 50% or 150%. The steps S3 to S14 can continue until calibration is deemed complete at the step S6.

Figure 14:
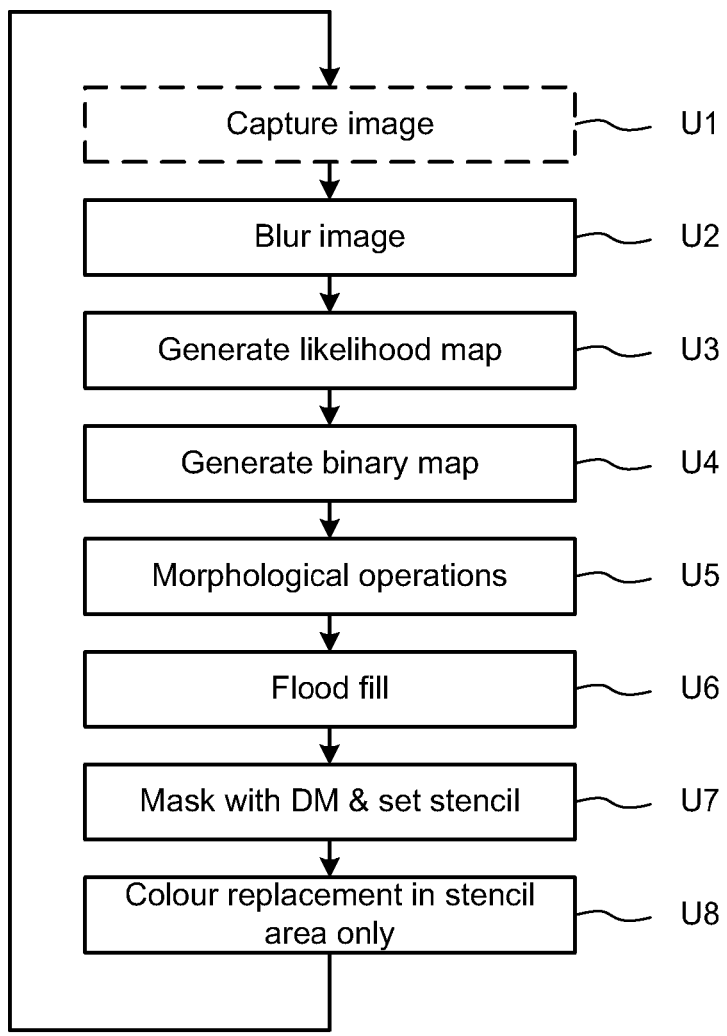
FIG. 14 schematically illustrates a colour replacement process.

Referring now to FIG. 14, a summary of the operation of colour replacement processing is schematically illustrated. The colour replacement processing takes place once the initial colour calibration processing has been completed. At a step U1, an image is captured. At steps U2 to U7, processing steps for generating a stencil (foreground area) based on the lookup table generated in the calibration stage, and based on the depth map generated by the depth sensor are performed in the same manner as the corresponding steps S8 to S14 in FIG. 13. Discussion of these is not repeated here in the interests of brevity. At a step U8, colour replacement takes place only in relation to pixels within the stencil area. Pixels outside the stencil area retain their original colours even if those original colour fall within the colour space defined for colour replacement. For those pixels within the stencil area, the above described steps for replacing their colour values with new colour values are conducted. This results in an output image in which only pixels relating to the garment of interest are colour-modified to desired colour values.

Lipstick Colour Replacement

Figure 15:
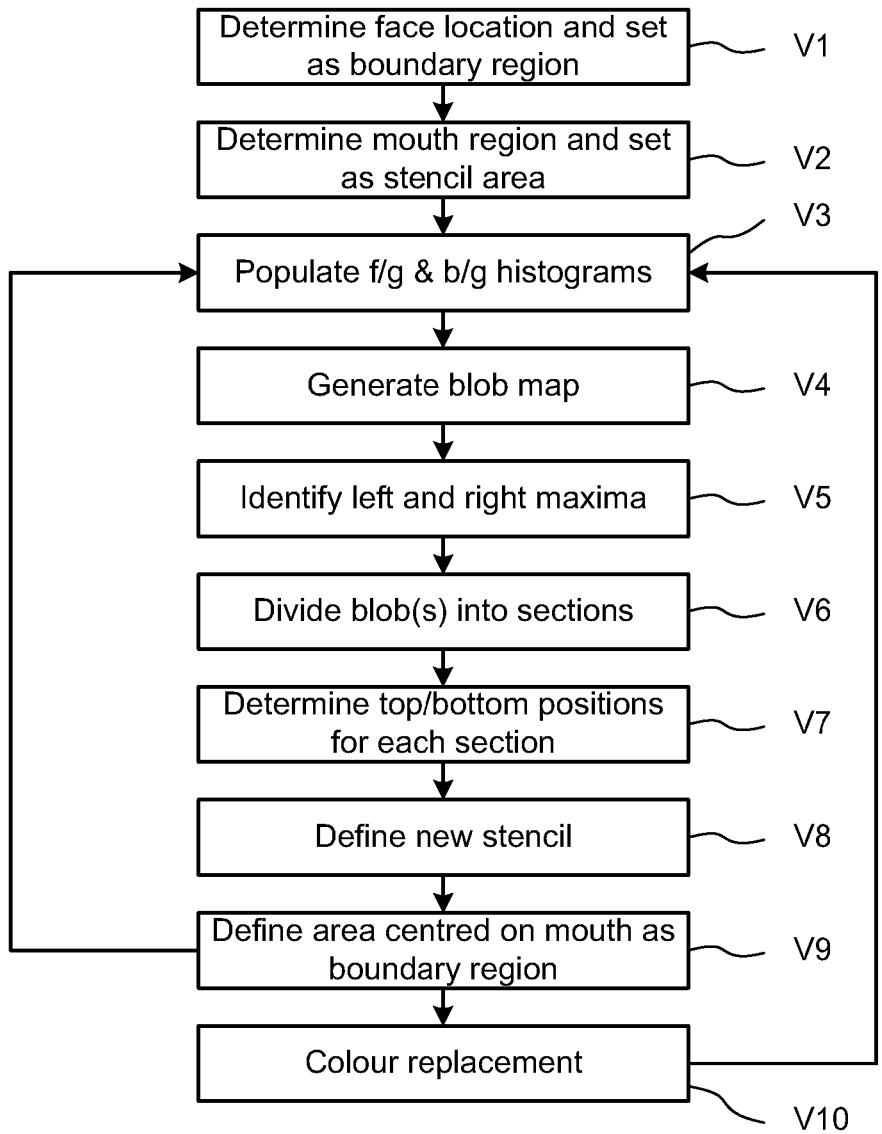
FIG. 15 schematically illustrates a colour calibration and replacement process for applying augmented reality lipstick.

In an alternative embodiment, rather than replacing the colour of a garment, the colour of a user's lips is changed, simulating the trying on of different colours and shades of lipstick. In this case no depth camera is used, and processing is carried out solely using image processing techniques. As a result, a simpler hardware setup can be used, permitting implementation on portable devices such a mobile phones and tablet computers. The lipstick replacement technique will now be described with reference to FIG. 15, which is a schematic flow diagram of the process.

In a first image frame, the face of the user is detected using a pre-learnt cascade of Haar like features and set as a boundary region at a step V1. The use of Haar techniques to isolate a face area from an image is well understood by the skilled person. Referring to FIG. 11A, the result of this process is shown as a rectangle indicating the image region considered to relate to the user's face. Then, the mouth area of the user is identified, again by known Haar techniques. These techniques may give rise to a number of candidates for the mouth region. If so, the candidate nearest to the bottom of the identified face area is selected as the mouth. A square portion of the image is then determined around the identified mouth region, and is set as a stencil area at a step V2. Referring to FIG. 11B, the result of this process is shown as rectangles around the user's mouth and eyes. The mouth is correctly selected as being the candidate feature nearest to the bottom of the image. The eyes are discarded as candidates.

At a step V3, a foreground colour histogram, similar to that described in relation the garment embodiment above, is populated with the frequency of occurrence of particular colours within the determined stencil area of the square portion of the image around the mouth region. Also at the step V3, a background histogram, again similar to that described in relation to the garment embodiment above, is populated with the frequency of occurrence of particular colours within the boundary region around the face area, but outside of the determined square portion (stencil). A Gaussian model and combined histogram (lookup table) are then generated from the foreground and background histograms in the same way as described above in relation to the garment embodiment. It will be understood that the background histogram in the present case does not relate to the entire area outside of the stencil area, but relates to a non-static area which surrounds the stencil area but which has its own external boundary, which can move as the user's face/mouth moves.

At a step V4, incoming video images are compared with the combined colour histogram, and a likelihood map is generated in a similar manner as described above in relation to the colour changing of garments. The likelihood values within the map are compared with a threshold value, with a binary image resulting—a value of "1" indicating that the likelihood value matched or exceeded the threshold, and a value of "0" indicating that the likelihood value was less than the threshold. The resulting binary map is then subject to morphological operations in the same manner as described above with reference to FIG. 9. It will be appreciated that the likelihood map and binary map need only be generated in relation to the area around the mouth. This reduces the likelihood of objects other than the mouth being picked out and subject to colour replacement processing, and also reduces the processing burden.

At this point, the binary map should contain either one or two large blobs. In particular, if the user has their mouth open then their two lips will appear as separate blobs (resulting in two large blobs) while if the user has their mouth closed then their two lips will appear as a single blob. This largest blob, or these largest blobs, are detected, for example using a flood fill operation. All other blobs within the binary map are ignored or discarded. For each of the one or two blobs representing the lips, an active contour is used to define both the top and bottom lip edges—this helps define a cleaner, less noisy edge. The edges, found by searching for the upper and lower bounds of the blob within the probability map, are located at predetermined horizontal spaces from one mouth corner to the other. In one example implementation illustrated schematically in FIG. 12, left and right most points 122 and 123 of a blob within the binary map are identified at a step V5, and the blob is divided into a plurality of sections between the left and right extremities at a step V6. In the present example a single blob represents the position of both lips, which are compressed together. For each of the four sections shown in FIG. 12 (it will be appreciated that four sections is merely an example, and any practical number of sections could be used instead), an average "y" value for each of the top and bottom edge of the lips is determined at a step V7, providing a set of four points 125a, 126a, 127a and 128a representing the top edge of the top lip, and a set of four points 125b, 126b, 127b and 128b representing the bottom edge of the bottom lip. It will be appreciated that where the lips are resolved separately, each of these lips will be represented by two sets of four points (to represent the top and bottom edges of the lip). An updated stencil is then set at a step V8, and an updated boundary region is set as an area centred on the currently detected position of the mouth (lips). During a calibration stage this process is repeated for future frames, with the foreground histogram continuing to be populated from pixels within the determined lips region within the binary map, and the background histogram continuing to be populated based on a search window at a position seeded from a position of the lips detected in the probability map of the most recently generated image. In other words, only in the initial frame are the stencil area and boundary region set using Haar feature detection. In subsequent frames the stencil area has a refined shape and position based on colour histogramming, and the boundary region is reduced in size from a square corresponding to the face area to a square area around the mouth, and tracks the mouth position based on colour histogramming. In other words, after the first frame the background histogram corresponds to pixels from a smaller spatial area than for the first frame. The external boundary of the spatial area to which the background histogram corresponds may vary between frames as the mouth/lip position is tracked.

The lip region defined based on the step V8 can then be augmented with a different colour at a step V10 using colour replacement techniques similar to those described above in relation to garment processing.

The above processes are then repeated until the lips are either no longer tracked/visible or their area has fallen below or raised above a certain size threshold.

The invention claimed is:

1. An image processing method performed by one or more hardware processors of a computing device, the method comprising:
repeatedly imaging, using a camera, a scene to form a series of input image;
for each of at least a first subset of the input images, conducting a colour calibration procedure of:
populating a foreground colour histogram, stored in a memory, with data values representing the frequency of occurrence of colour values in a stencil area of the input image of the first subset;
populating a background colour histogram, stored in the memory, with data values representing the frequency of occurrence of colour values outside of the stencil portion of the input image of the first subset; and
updating the stencil area based on a determination, from the colour values of pixels in the input image, of likelihood values representing probability that pixels belong to an image area of interest, the likelihood value for each colour value being determined from a combination of the stored foreground and background colour histograms; and
for each of at least a second subset of the input images, conducting a colour replacement procedure of:
generating a depth map of the scene corresponding to the input image of the second sub set;
determining, from the depth map, the area of interest in the input image of the second subset to which colour replacement processing can be applied;
identifying pixels within the area of interest of the input image having a colour value within a specified colour range;
replacing the colour value of each identified pixel with a replacement colour value to generate an augmented output image; and
outputting the augmented output image to a display.

2. An image processing method according to claim 1, wherein the area of interest determined from the depth map is a foreground area of the image.

3. An image processing method according to claim 2, comprising a step of:
calibrating the specified colour range to the colour distribution of an area of interest in the input image;
wherein the area of interest used for colour calibration is based on the foreground area determined from the depth map.

4. An image processing method according to claim 1, wherein:
the stencil area is initialised as a mouth area of the face of a person within the scene being imaged; and
the background colour histogram is populated with the frequency of occurrence of colour values outside of the stencil portion of the input image but within a bounded area surrounding the stencil portion, the bounded area being initialised as a face area of the person within the scene being imaged.

5. The method of claim 1, further comprising calibrating a depth sensor with a first camera, the depth sensor being provided with a second camera pre-calibrated to the depth sensor, by:
imaging a scene in which a predetermined marker is visible using the first camera to form a first input image;
imaging the scene in which the predetermined marker is visible using the second camera to form a second input image;
detecting the position and orientation of the predetermined marker within the first input image and the second image respectively;
calculating a transform representing a difference in alignment between the first input image and the second input image based on the difference in the detected position and orientation of the predetermined marker within the first input image and the second input image; and
mapping depth information captured by the depth sensor to image information captured by the first camera using the calculated transform.

6. An image processing method according to claim 1, wherein the colour calibration procedure is repeated until the stencil area stabilises to match the image area of interest.

7. An image processing apparatus, comprising:
a video camera operable to repeatedly image a scene to form a series of input images;
a depth sensor operable to generate a depth map of the scene;
a processor, said processor configured to:
conduct, for each of at least a first subset of the input images, a colour calibration procedure of:
populating a foreground colour histogram, stored in a memory, with data values representing the frequency of occurrence of colour values in a stencil area of the input image of the first subset;

populating a background colour histogram, stored in the memory, with data values representing the frequency of occurrence of colour values outside of the stencil portion of the input image of the first subset; and updating the stencil area based on a determination, from the colour values of pixels in the input image, of likelihood values representing probability that pixels belong to an image area of interest, the likelihood value for each colour value being determined from a combination of the stored foreground and background colour histograms; and conduct, for each of at least a second subset of the input images, a colour replacement procedure of:

determining, from the depth map of the scene corresponding to the input image of the second subset, the area of interest in the input image of the second subset to which colour alteration processing may be applied;

identify pixels within the area of interest in the input image having a colour value within a specified colour range; and replace the colour value of each identified pixel with a replacement colour value to generate an augmented output image; and a display device operable to display the output augmented image.

8. An image processing apparatus according to claim 7, wherein the area of interest determined from the depth map is a foreground area of the image.

9. An image processing apparatus according to claim 8, wherein the processor is configured to calibrate the specified colour range to the colour distribution of an area of interest in the input image; wherein the area of interest used for colour calibration is based on the foreground area determined from the depth map.

10. A non-transitory computer-readable medium comprising computer-executable instructions, that when executed by one or more hardware processors of a computing device perform the method of:

repeatedly imaging, using a camera, a scene to form a series of input images;

for each of at least a first subset of the input images, conducting a colour calibration procedure of:

populating a foreground colour histogram, stored in a memory, with data values representing the frequency of occurrence of colour values in a stencil area of the input image of the first subset; and populating a background colour histogram, stored in the memory, with data values representing the frequency of occurrence of colour values outside of the stencil portion of the input image of the first subset; and for each of at least a second subset of the input images, conducting a colour replacement procedure of:

generating a depth map of the scene corresponding to the input image of the second sub set;

determining, from the depth map, an area of interest in the input image of the second subset to which colour replacement processing can be applied;

identifying pixels within the area of interest of the input image having a colour value within a specified colour range, by updating the stencil area based on a determination, from the colour values of pixels within the area of interest of the input image, of likelihood values representing probability that pixels belong to the image area of interest, the likelihood value for each colour value being determined from a combination of the stored foreground and background colour histograms;

replacing the original colour value of each identified pixel within the updated stencil area of the input image of the second subset with a replacement colour value to generate an augmented output image; and outputting the augmented output image to a display.

* * * * *